United States Patent [19]

Yasuoka et al.

[11] Patent Number: 5,330,839
[45] Date of Patent: Jul. 19, 1994

[54] ELECTROCOATING COMPOSITION CONTAINING BLOCKED ISOCYANATE, DIALKYLTIN AROMATIC CARBOXYLATE AND A BISMUTH OR ZIRCONIUM COMPOUND

[75] Inventors: Yoshio Yasuoka, Fujisawa; Masafumi Kume, Hiratsuka; Tadayoshi Hiraki, Odawara; Kiyoshi Kato, Naka; Hidehiko Haneishi; Masato Yamamoto, both of Hiratsuka, all of Japan

[73] Assignee: Kansai Paint Co., Ltd., Hyogo, Japan

[21] Appl. No.: 865,585

[22] Filed: Apr. 9, 1992

[30] Foreign Application Priority Data

Apr. 16, 1991 [JP] Japan .................. 3-114137
Jan. 10, 1992 [JP] Japan .................. 4-020682

[51] Int. Cl.⁵ ............... C09D 5/44; C08G 18/22
[52] U.S. Cl. .................. 428/413; 204/181.7; 523/415; 528/45; 528/92; 524/589; 524/591
[58] Field of Search ............ 204/181.7; 428/413; 523/415; 528/45, 92; 524/589, 591

[56] References Cited

U.S. PATENT DOCUMENTS

| | | | |
|---|---|---|---|
| 4,256,621 | 3/1981 | Shimokai et al. | 523/415 |
| 4,904,361 | 2/1990 | Motohashi et al. | 523/415 |
| 5,002,690 | 3/1991 | Blount | 252/182.14 |

FOREIGN PATENT DOCUMENTS 2188327 9/1987 United Kingdom.

OTHER PUBLICATIONS

Takeshi et al., Patent Abstracts of Japan, vol. 7, No. 155 (C-175) (Jul. 7, 1983).

*Primary Examiner*—Frederick Krass
*Attorney, Agent, or Firm*—Wenderoth, Lind & Ponack

[57] ABSTRACT

A blocked isocyanate group-containing electrocoating composition comprising at least one dialkyltin aromatic carboxylate and at least one bismuth or zirconium compound as a combined curing catalyst. This electrocoating composition gives an electrocoating film superior in corrosion resistance and low-temperature curability and has good bath stability over an extended period.

12 Claims, No Drawings

ELECTROCOATING COMPOSITION CONTAINING BLOCKED ISOCYANATE, DIALKYLTIN AROMATIC CARBOXYLATE AND A BISMUTH OR ZIRCONIUM COMPOUND

The present invention relates to an electrocoating composition which can give a coating film superior in corrosion resistance and weather resistance, which has excellent low-temperature curability, and which has good bath stability over an extended period.

Electrocoatings have been in wide practical use for coating of automobiles, electric appliances, etc. having a number of bag-shaped structure portions, because they can give a coating film superior in throwing property and corrosion resistance.

In the fields such as automobile bodies and the like where corrosion resistance is a very important requirement, anionic electrodeposition has recently been or is still being switched to cationic electrodeposition because cationic electrodeposition can give a coating film superior in corrosion resistance, in particular.

Currently, the mainstream of cationic electrocoatings is those comprising a resin of a type which is cured by a reaction between blocked isocyanate group and hydroxyl group. In these cationic electrocoatings, there are used, as a dissociation catalyst (a curing catalyst) for blocked isocyanate group, organotin compounds such as dibutyltin oxide (DBTO), dioctyltin oxide (DOTO), dibutyltin dilaurate (DBTDL), dioctyltin dilaurate (DOTDL), dibutyltin diacetate (DBTDA) and the like (reference is made to U.S. Pat. Nos. 4,071,428, 4,615,779 and 4,785,068). DBTO, DOTO, etc. are difficulty soluble in solvents and are therefore used in the form of a fine powder. DBTDL, DOTDL, DBTDA, etc are used as they are, or after being dissolved in a solvent. When these dissociation catalysts are used in the form of a powder, however, they are difficult to handle (they float on the surface of the electrocoating bath containing them) and undergo catalyst poisoning; moreover, when they are insufficiently dispersed in a coating composition, the composition gives a film having defects such as cissing and the like. Further, being granular, they must be used in a large amount in order to obtain sufficient curability, which is disadvantageous in cost. Meanwhile, DBTDL, DOTDL, DBTDA, etc. are preferable in practical use because they are easy to handle and require no dispersion; however, since they have poor compatibility with resins generally used in electrocoating, epoxy resins, in particular, the electrocoating compositions produced therewith have serious problems in that the composition tends to give a film having defects such as cissing, small lumps and the like and that the organotin compound in the composition is expelled out of the curing reaction system with the lapse of time and loses its catalytic effect.

As a measure to avoid the above problems, there was proposed, for example, an organotin compound having good compatibility with a base resin (U.S. Pat. No. 4,904,361), whereby the above problems were alleviated considerably. Even said dissociation catalyst imparts no fully satisfactory low-temperature curability and corrosion resistance yet.

In order to obtain an electrocoating film with improved corrosion resistance, it is often conducted to add a lead compound (e.g. lead acetate or lead chromate) to an electrocoating composition as a rust-preventive pigment and also as a catalyst. In view of the public hazard problem associated with the lead compound, there is desired a method capable of obtaining similar corrosion resistance without using any lead compound.

It is an object of the present invention to provide a blocked isocyanate group-containing electrocoating composition comprising an alkyltin ester compound (liquid) and a bismuth or zirconium compound (these compounds are easy to handle, have no catalyst poisoning, and are effective in small amounts), which composition shows no reduction in catalytic effect with the lapse of time and can give a film having no defects such as cissing, small lumps and the like and having excellent low-temperature curability and corrosion resistance.

In order to achieve the above object, the present inventors contracted a study on catalysts capable of imparting low-temperature curability to an electrocoating composition. As a result, the present inventors found that the combined use, as the curing catalyst for blocked isocyanate group-containing electrocoating composition, of at least one dialkyltin aromatic carboxylate and at least one bismuth or zirconium compound can allow the resulting electrocoating composition to form a film having sufficient corrosion resistance and a significantly reduced baking and curing temperature. The finding has led to the completion of the present invention.

According to the present invention, there is provided a blocked isocyanate group-containing electrocoating composition comprising:

(a) at least one dialkyltin aromatic carboxylate represented by the following formula (I) or (II)

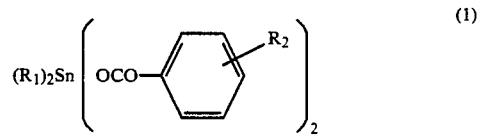

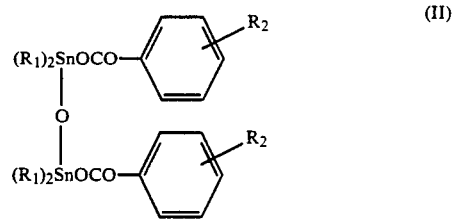

wherein $R_1$ represents an alkyl group having 1–12 carbon atoms and $R_2$ represents a hydrogen atom or an alkyl group having 1–4 carbon atoms, and (b) at least one bismuth or zirconium compound.

The electrocoating composition of the present invention is hereinafter described in more detail.

The dialkyltin aromatic carboxylate (a) represented by the formula (I) or (II), used in the electrocoating composition of the present invention is a substituted or unsubstituted benzoic acid ester of an alkyltin and acts as a dissociation catalyst for blocked isocyanate group. In the formula (I) or (II), the alkyl group represented by $R_1$ may be a straight chain or a branched chain and has 1–12, preferably 4–10, more preferably 4–8 carbon atoms. Specific examples of the alkyl group $R_1$ include methyl, ethyl, propyl, isopropyl, butyl, secbutyl, isobutyl, tert-butyl, pentyl, isoamyl, hexyl, octyl, 2-ethylhexyl, decyl and dodecyl. The alkyl group represented by $R_2$ may also be a straight chain or a branched chain and has 1–4 carbon atoms. Specific examples of the alkyl group $R_2$ include methyl, ethyl, propyl and isopropyl. However, $R_2$ is preferably a hydrogen atom generally.

Typical examples of the dialkyltin aromatic carboxylate used in the present invention are as follows.

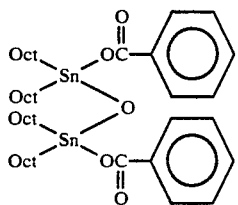

Bis(dioctylbenzoyloxytin) oxide

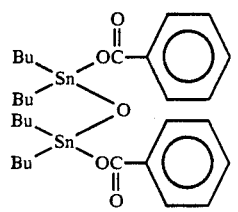

Bis(dibutylbenzoyloxytin) oxide

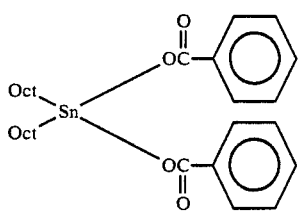

Dioctyltin dibenzoate

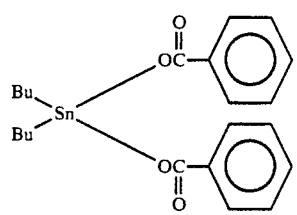

Bibutyltin dibenzoate

The bismuth or zirconium compound (b) used in the present invention together with the above dialkyltin aromatic carboxylate of an aromatic carboxylic acid, includes, for example, hydroxides such as bismuth hydroxide, zirconium hydroxide and the like; oxides such as bismuth trioxide, zirconium dioxide and the like; and inorganic or organic acid salts such as bismuth nitrate, bismuth benzoate, bismuth citrate, bismuth oxycarbonate, bismuth silicate, zirconium silicate and the like. Of these, bismuth hydroxide, bismuth silicate and zirconium hydroxide are preferable, and particularly preferable is bismuth hydroxide. Also, antimony compounds such as antimony oxide and the like have a slight effect and, in some cases, can be used in combination with the above bismuth or zirconium compounds.

In the present electrocoating composition, the total amount [(a) +(b)]of (a) the dialkyltin aromatic carboxylate of an aromatic carboxylic acid and (b) the bismuth or zirconium compound can be varied over a wide range depending upon the properties required for the electrocoating composition, but can be in the range of generally 0.1–10 parts by weight, preferably 0.2–5 parts by weight, more preferably 0.5–5 parts by weight per 100 parts by weight of the resin solid content in the electrocoating composition.

The mixing ratio (a):(b) of (a) the dialkyltin aromatic carboxylate of an aromatic carboxylic acid and (b) the bismuth or zirconium compound can be in the range of 1:10 to 10:1 by weight ratio. Any mixing ratio in the above range can give better curability of coating film than the single use of (a) or (b). A mixing ratio in the range of 1:5 to 5:1, particularly 1:2 to 2:1 can give a still better result.

In the present invention, "the blocked isocyanate group-containing electrocoating composition" can be an electrocoating composition which contains a blocked isocyanate group-containing vehicle resin (or resin composition) and wherein the blocked isocyanate group is dissociated into a blocking agent and a free isocyanate group and the free isocyanate group reacts with the active hydrogen-containing portion in the vehicle resin (or resin composition) to give rise to the curing of the composition. The blocked isocyanate group-containing electrocoating composition includes electrocoating compositions containing a vehicle resin which has a blocked isocyanate group and an active hydrogen-containing portion in the molecule and which is self-crosslinkable without requiring any external crosslinking agent, and electrocoating compositions containing a vehicle resin composition of external crosslinking type which consists essentially of (1) a base resin having substantially no blocked isocyanate group but having an active hydrogen-containing portion reactive with an isocyanate group and (2) a blocked isocyanate compound as an external crosslinking agent.

The blocked isocyanate compound used in the vehicle resin composition of external crosslinking type includes an addition reaction product between stoichiometric amounts of a polyisocyanate compound and an isocyanate-blocking agent. This polyisocyanate compound includes, for example, aromatic, alicyclic or aliphatic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate, isophorone diisocyanate and the like; and isocyanate-terminated compounds obtained by reacting an excessive amount of such an isocyanate compound with an active hydrogen-containing low-molecular compound such as ethylene glycol, propylene glycol, trimethylolpropane, hexanetriol, castor oil or the like.

The isocyanate-blocking agent can be added to the isocyanate group of a polyisocyanate compound to block the group. The blocked isocyanate compound obtained by the addition must be stable at room temperature and, when heated to ordinarily about 100° C. to about 200° C., preferably about 120 °C. to about 190° C., must be able to dissociate into a blocking agent and a free isocyanate group. The blocking agent satisfying such requirements include, for example, lactam compounds such as ϵ-caprolactam, γ-butyrolactam and the like; oxime compounds such as methyl ethyl ketoxime, cyclohexanone oxime and the like; phenolic compounds such as phenol, p-tert-butylphenol, cresol and the like; aliphatic alcohols such as n-butanol, 2-ethylhexanol and the like; aromatic alkyl alcohols such as phenylcarbinol, methyl-phenylcarbinol and the like; and ether alcohol compounds such as ethylene glycol monobutyl ether and the like.

Of these, oxime or lactam type blocking agents are particularly preferable in view of the curability of the electrocoating composition obtained therewith, because they can be dissociated from the blocked isocyanate group at relatively low temperatures.

In the self-crosslinkable type resin having a blocked isocyanate group, the introduction of blocked isocyanate group into base resin can be conducted by a per se known method, for example, by reacting a free isocyanate group of a partially blocked polyisocyanate compound with an active hydrogen-containing portion of a base resin.

The electrocoating composition of the present invention may be an anionic type or a cationic type. The base resin used therein may be any of an epoxy resin, an acrylic resin, a polybutadiene resin, an alkyd resin, a polyester resin, etc., but, in view of the corrosion resistance, is preferably a cationic resin, particularly preferably a polyamine resin represented by, for example, an amine-added epoxy resin. As described above, when the base resin is an external crosslinking type, the resin must be used in combination with a blocked isocyanate compound as mentioned above.

The amine-added epoxy resin includes, for example, (i) addition products between a polyepoxide compound and a primary mono- or polyamine, a secondary mono- or polyamine, or a primary and secondary mixed polyamine (reference is made to, for example, U.S. Pat. No. 3,984,299); (ii) addition products between a polyepoxide compound and a secondary mono- or polyamine having a primary amino group converted into a ketimine form (reference is made to, for example, U.S. Patent 4,017,438); and (iii) reaction products obtained by etherification between a polyepoxide compound and a hydroxy compound having a primary amino group converted into a ketimine form [reference is made to, for example, Japanese Patent Application Kokai (Laid-Open) No. 43013/1984].

The polyepoxide compound used in the production of the amine-added epoxy resin has at least two epoxy groups in the molecule and preferably has a number-average molecular weight of generally at least 200, preferably 400–4,000, more preferably 800–2,000. The polyepoxide compound is particularly preferably a compound obtained by a reaction between a polyphenol compound and epichlorohydrin. The polyphenol compound used for the production of the polyepoxide compound includes, for example, bis(4-hydroxyphenyl)-2,2-propane, 4,4-dihydroxybenzophenone, bis(4-hydroxyphenyl)-1,1ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-hydroxyphenyl)methane, tetra(4-hydroxyphenyl)-1,1,-2,2-ethane, 4,4-dihydroxydi-phenyl-sulfone, phenolic novolac and cresylic novolac.

The polyepoxide compound may be partially reacted with a polyol, a polyether polyol, a polyester polyol, a polyamideamine, a polycarboxylic acid, a polyisocyanate compound or the like. Or, the polyepoxide compound may be graft-polymerized with ε-caprolactone, an acrylic monomer or the like.

The blocked isocyanate group-containing electrocoating composition of the present invention comprises (a) a dialkyltin aromatic carboxylate compound of an aromatic carboxylic acid and (b) a bismuth or zirconium compound. The addition timing of these components is not critical; however, it is generally preferable that the dialkyltin aromatic carboxylate compound (a) be added before the vehicle resin for electrocoating is made water-soluble or water-dispersible and that the bismuth or zirconium compound (b) be added to the electrocoating in the form of a paste obtained by grinding in a ball mill or the like together with additives such as pigment and the like. The addition of the dialkyltin aromatic carboxylate compound after the vehicle resin has been made water-soluble or water-dispersible, tends to invite insufficient compatibility.

The neutralization of the vehicle resin for electrocoating to impart water solubility or dispersibility thereto can ordinarily be conducted, when the resin is a cationic resin, by neutralizing the resin with a water-soluble organic acid such as formic acid, acetic acid, lactic acid or the like to impart water solubility or dispersibility and, when the resin is an anionic resin, by neutralizing the resin with an alkali such as amine, alkali metal hydroxide or the like to impart water solubility or dispersibility.

The electrocoating composition of the present invention may further comprise, as necessary, ordinary additives for coatings, for example, coloring pigments such as titanium white, carbon black, red iron oxide, chrome yellow and the like; extender pigments such as talc, calcium carbonate, mica, clay, silica and the like; and rust-preventive pigments such as chrome pigment (e.g. strontium chromate), lead pigment (e.g. basic lead silicate, lead chromate) and the like.

The electrocoating composition of the present invention can be coated on the surface of a desired substrate by electrodeposition. The electrodeposition can be conducted generally by diluting the composition content of about 5–40% by weight, adjusting the aqueous with deionized water or the like so as to give a solid solution or dispersion to pH 5.5–9.0 to prepare an electrocoating bath comprising the electrocoating composition of the present invention, controlling the temperature of the bath ordinarily at 15°–35° C., and applying a negative voltage of 100–400 V.

The film thickness formed by electrodeposition of the electrocoating composition of the present invention is not critical, but is generally preferable to be in the range of 10–40 μm in terms of cured film thickness. The appropriate temperature for baking and curing the film is generally 100°–200° C., preferably 120°–190° C.

In the blocked isocyanate group-containing electrocoating composition of the present invention, (a) a dialkyltin aromatic carboxylate of an aromatic carboxylic acid and (b) a bismuth or zirconium compound are used as a catalyst for dissociating the blocked isocyahate group, whereby the composition retains its catalytic effect over an extended period and the film formed by electrodeposition of the composition gives rise to no problems such as cissing, small lumps and the like and has excellent low-temperature curability, improved corrosion resistance and improved weather resistance. The corrosion resistance, in particular, has been found to be about equal to the rust prevention exhibited when a lead compound or the like is added.

The reason why the present composition shows good properties such as mentioned above, is presumed to be that the dialkyltin aromatic carboxylate of an aromatic carboxylic acid, having both an alkyl group and an aromatic group, has good compatibility with the resin for electrocoating and further that the bismuth or zirconium compound exhibits a catalytic action synergistically with the tin compound (the reason is not made clear yet) imparting excellent low-temperature curability to the composition. The reason why the present composition gives a film superior in corrosion resistance, in particular, is not clear, either, but is presumed to be that the bismuth or zirconium compound exhibits a certain action at the interface between the film and its substrate. Thus, the electrocoating composition of the present invention shows good compatibility even when there is used, as the base resin, a bisphenol type epoxy resin for electrocoating having very poor compatibility with conventional dissociation catalysts, and can give an electrocoating film having excellent corrosion resistance.

The present invention is hereinafter described more specifically by way of Examples. However, the present invention is not restricted to these Examples. In the Examples, parts refer to part by weight.

EXAMPLE 1

In 300 parts of methyl isobutylketone was dissolved 500 parts of an epoxy resin having an epoxy equivalent of 500 (Epikote 1001 manufactured by Shell Chemical Co.). Thereto was dropwise added 73 parts of diethylamine at 80°–100° C. The resulting mixture was heated at 120° C. for 1 hour.

174 parts of tolylene diisocyanate was dropwise added to 180 parts of ethyl cellosolve at 60°–80° C, and the mixture was heated at 120° C. for 1 hour.

This mixture was mixed with the above prepared epoxy-amine addition product. To ! 35 parts of the resulting resin solution were added 1 part of a curing catalyst shown in Table 1, 5 parts of acetic acid and 860 parts of deionized water to prepare various aqueous dispersion samples each of pH 4.0.

Using each of the samples as an electrocoating bath and using a degreased steel plate as a cathode, electrodeposition was conducted at 190 V at 25° C. for 2 minutes. Then, baking was conducted at temperatures shown in Table 1, each for 30 minutes to prepare coating films each of 10 μm in thickness. Each of the baked films was strongly rubbed with an absorbent cotton containing ethyl cellosolve, 10 times each forward and backward and dried, after which each film surface was observed. The results are shown in Table 1. In Table 1, samples Nos. 1-8 represent comparative examples and samples Nos. 9-12 represent examples of the present invention. The evaluation of each film surface was made using the following yardstick.

⊙: Film surface is strong and has no flaw.
○: Film surface has slight flaws.
ΔFilm surface has a number of flaws.
X: Film is partially peeled and substrate is partially exposed.
XX: Film is entirely peeled.

As is clear from Table 1, the sample Nos. 9-12 using the tin compound and bismuth or zirconium compound of the present invention in combination are excellent in low-temperature curability of electrocoating film, as compared with the sample Nos. 2-5 using a conventionally used tin catalyst or the sample Nos. 6-8 using only a tin compound used in the present invention.

TABLE 1

| Sample No. | Curing catalyst | Baking temperature | | |
|---|---|---|---|---|
| | | 150° C. | 160° C. | 170° C. |
| 1 | Not used | XX | XX | X |
| 2 | Di-n-butyltin oxide | XX | Δ | ⊙ |
| 3 | Di-n-octyltin oxide | XX | Δ | ⊙ |
| 4 | Di-n-butyltin dilaurate | XX | X | Δ |
| 5 | Di-n-octyltin dilaurate | XX | X | Δ |
| 6 | Compound ① | ○ | ⊙ | ⊙ |
| 7 | Compound ② | Δ | ⊙ | ⊙ |
| 8 | Compound ③ | ○ | ⊙ | ⊙ |
| 9 | Compound ① + compound ⑤, 1:1 (weight ratio) | ⊙ | ⊙ | ⊙ |
| 10 | Compound ② + compound ⑥, 1:1 (weight ratio) | ⊙ | ⊙ | ⊙ |
| 11 | Compound ③ + compound ⑥, 2:1 (weight ratio) | ⊙ | ⊙ | ⊙ |
| 12 | Compound ① + compound ⑦, 1:1 (weight ratio) | ⊙ | ⊙ | ⊙ |

Note:
The compounds ①, ②, ③, ⑤, ⑥, and ⑦ refer to the followings.
① = Dibutylin dibenzoate
② = Dioctylin dibenzoate
③ = Bis(dibutylbenzoyloxytin)oxide
⑤ = Bismuth hydroxide
⑥ = Bismuth oxide
⑦ = Zirconium hydroxide

EXAMPLE 2

In 1012 parts of butyl cellosolve was dissolved 1900 parts of Epon 1004 (a bisphenol A type epoxy resin having an epoxy equivalent of 950, manufactured by Yuka Shell Epoxy K.K.). Thereto was dropwise added 124 parts of diethylamine at 80°–100° C. The resulting mixture was kept at 120° C. for 2 hours to obtain an epoxy resin-amine addition product having an amine value of 47.

In 429 parts of methyl isobutyl ketone was dissolved 1000 parts of a dimer acid type polyamide resin having an amine value of 100 [Versamide 460 (trade name) manufactured by Henkel Hakusui Co., Ltd.]. The resulting solution was refluxed at 130°–150° C. and the generated water was distilled off to convert the terminal amino group of the amide resin into a corresponding ketimine. The reaction mixture was kept at 150° C. for about 3 hours and, after the distillation of water was over, was cooled to 60° C. The mixture was added to the above epoxy resin-amine addition product, and the resulting mixture was kept at 100° C. for 1 hour and then cooled to room temperature to obtain a varnish of an epoxy resin-amino-polyamide addition resin having a solid content of 68% and an amine value of 65.

There were mixed 103 parts of the above varnish (70 parts as solid content), 30 parts (as solid content) of xylylene diisocyanate blocked with 2-ethylhexyl alcohol, 1 part of dibutyltin dibenzoate, 1 part of lead acetate and 15 parts of 10 acetic acid. The mixture was uniformly stirred. Thereto was dropwise added 150 parts of deionized water in about 15 minutes, with vigorous stirring, to obtain a clear emulsion for cationic electrodeposition having a solid content of 35 . To 286 parts of this clear emulsion was added 69.7 parts of a pigment paste having a recipe shown in the compound 1 of Table 2, with stirring. The resulting mixture was diluted with 294.2 parts of deionized water to obtain a cationic electrocoating composition.

TABLE 2

| Raw materials | Pigment paste | | | |
|---|---|---|---|---|
| | Compound 1 | Compound 2 | Compound 3 | Compound 4 |
| Epoxy resin for pigment dispersion | 5 | 5 | 5 | 5 |
| Titanium oxide | 14 | 14 | 14 | 14 |
| Refined clay | 10 | 10 | 10 | 10 |
| Carbon black | 1 | 1 | 1 | 1 |
| Deionized water | 38.7 | 38.7 | 38.7 | 39.7 |
| Bismuth hydroxide | 1 | | | |
| Zirconium hydroxide | | 1 | | |
| Basic bismuth silicate* | | | 1 | |
| Total | 69.7 | 69.7 | 69.7 | 69.7 |

*A product of Kikuchi Shikiso Kogyo K.K.

EXAMPLE 3

A cationic electrocoating composition was obtained in the same procedure as in Example 2 except that the pigment paste of the compound 1 was replaced by a pigment paste having a recipe shown in the compound 3 of Table 2.

EXAMPLE 4

A cationic electrocoating composition was obtained in the same procedure as in Example 2 except that dibutyltin dibenzoate was replaced by 1 part of dioctyltin dibenzoate and the pigment paste of the compound 1 was replaced by a pigment paste shown in the compound 2 of Table 2.

EXAMPLE 5

A cationic electrocoating COMPOSITION was obtained in the same procedure as in Example 2 except that no lead acetate was used, the amount of 10 % acetic acid was changed to 17 parts and dibutyltin dibenzoate was replaced by dioctyltin dibenzoate.

EXAMPLE 6

A cationic electrocoating composition was obtained in the same procedure as in Example 2 except that no lead acetate was used, the amount of 10 % acetic acid was changed to 17 parts, dibutyltin dibenzoate was replaced by dioctyltin dibenzoate and the pigment paste of the compound 1 was replaced by the pigment paste of the compound 2 of Table 2.

COMPARATIVE EXAMPLE 1

A cationic electrocoating composition was obtained in the same procedure as in Example 2 except that the pigment paste of the compound 1 of Table 2 was replaced by a pigment paste of the compound 4 and the amount of dibutyltin dibenzoate was changed to 2 parts.

COMPARATIVE EXAMPLE 2

A cationic electrocoating composition was obtained in the same procedure as in Comparative Example 1 except that dibutyltin dibenzoate was replaced by 2 parts of dioctyltin dibenzoate.

COMPARATIVE EXAMPLE 3

A cationic electrocoating composition was obtained in the same procedure as in Comparative Example 1 except that no lead acetate was used and the amount of 10 % acetic acid was changed to 17 parts.

COATING TEST

In each of the cationic electrocoating compositions obtained in Examples 2-6 and Comparative Examples 1-3 was immersed a cold rolled dull finish steel plate of 8×150×70 mm treated with Palbond #3030 (a zinc phosphate treating agent manufactured by Nihon Parkerizing Co., Ltd.). Electrodeposition was conducted at a voltage of 300 V using the steel plate as a cathode to form an electrocoating film of about 20 μm when dried. The film was water-washed and baked. The baking was conducted at six-level ambient temperatures each for 20 minutes using an electric hot air dryer. The results are shown in Table 3.

TABLE 3

| Test item | Example No. | Baking temperature | | | | | |
|---|---|---|---|---|---|---|---|
| | | 120° C. | 130° C. | 140° C. | 150° C. | 160° C. | 170° C. |
| Curability (*1) | Example 2 | ○ | ○ | ○ | ○ | ○ | ○ |
| | 3 | ○ | ○ | ○ | ○ | ○ | ○ |
| | 4 | ○ | ○ | ○ | ○ | ○ | ○ |
| | 5 | X | ○ | ○ | ○ | ○ | ○ |
| | 6 | X | ○ | ○ | ○ | ○ | ○ |
| | Comparative Example 1 | X | X | △ | ○ | ○ | ○ |
| | 2 | X | △ | ○ | ○ | ○ | ○ |
| | 3 | X | X | X | X | ○ | ○ |
| Impact resistance (*2) | Example 2 | ○ | ○ | ○ | ○ | ○ | ○ |
| | 3 | ○ | ○ | ○ | ○ | ○ | ○ |
| | 4 | ○ | ○ | ○ | ○ | ○ | ○ |
| | 5 | X | ○ | ○ | ○ | ○ | ○ |
| | 6 | X | ○ | ○ | ○ | ○ | ○ |
| | Comparative Example 1 | X | X | △ | ○ | ○ | ○ |
| | 2 | X | △ | ○ | ○ | ○ | ○ |
| | 3 | X | X | X | X | ○ | ○ |
| Corrosion resistance (*3) | Example 2 | ⊙ | ⊙ | ⊙ | ⊙ | ⊙ | ⊙ |
| | 3 | ⊙ | ⊙ | ⊙ | ⊙ | ⊙ | ⊙ |
| | 4 | ⊙ | ⊙ | ⊙ | ⊙ | ⊙ | ⊙ |
| | 5 | X | ○ | ⊙ | ⊙ | ⊙ | ⊙ |
| | 6 | X | ○ | ⊙ | ⊙ | ⊙ | ⊙ |

TABLE 3-continued

| Test item | Example No. | Baking temperature | | | | | |
|---|---|---|---|---|---|---|---|
| | | 120° C. | 130° C. | 140° C. | 150° C. | 160° C. | 170° C. |
| | Comparative Example 1 | X | Δ | ○ | ○ | ⊙ | ⊙ |
| | 2 | X | Δ | ○ | ⊙ | ⊙ | ⊙ |
| | 3 | X | X | X | X | ○ | ⊙ |
| Three-coat clarity (*4) | Example 2 | ⊙ | ⊙ | ⊙ | ⊙ | ⊙ | ⊙ |
| | 3 | ⊙ | ⊙ | ⊙ | ⊙ | ⊙ | ⊙ |
| | 4 | ⊙ | ⊙ | ⊙ | ⊙ | ⊙ | ⊙ |
| | 5 | X | ○ | ⊙ | ⊙ | ⊙ | ⊙ |
| | 6 | X | ○ | ⊙ | ⊙ | ⊙ | ⊙ |
| | Comparative Example 1 | X | X | Δ | ○ | ○ | ⊙ |
| | 2 | X | ○ | ○ | ⊙ | ⊙ | ⊙ |
| | 3 | X | X | X | X | ○ | ⊙ |

The tests for properties shown in Table 3 were conducted in accordance with the following methods.

(*1) Curability: The coated surface of an electrocoated steel plate was rubbed with a four-layered gauze impregnated with methyl isobutyl ketone, at a pressure of about 4 kg/cm² over a length of about 3-4 cm 20 times each forward and backward. Then, the appearance of the coated surface was visually evaluated.

○: Coated surface has no flow.
Δ: Coated surface has flows but not substrate is seen.
X: There is dissolution of coated film and substrate is seen.

(*2) Impact resistance: Test was conducted using a DuPont impact tester, under the condition of diameter of impact center=½inch, height of falling weight=50 cm and measurement temperature =20° C. The dented portion formed by impact was visually evaluated.

○: No change is seen.
Δ: Fine cracks are seen slightly.
X: Large cracks are seen.

(*3) Corrosion resistance: The coated surface of an electrocoated steel plate was cross-cut with a knife so that the cut reached the substrate, and then was subjected to a salt spray test for 840 hours in accordance with JIS Z 2371. Evaluation was made based on the widths of the rust and blister which developed from the knife cut.

⊙The maximum width of rust or blister is less than 1 mm (one side) when measured from the cut.
○: The maximum width of rust or blister is 1 mm to less than 2 mm (one side) when measured from the cut.
Δ: The maximum width of rust or blister is 2 mm to less than 3 mm (one side) when measured from the cut, and blister is seen on the considerable area of the flat portion.
X: The maximum width of rust or blister is 3 mm or more when measured from the cut, and blister is seen on the whole area of the coated surface.

(*4) 3-Coat clarity: On the coated surface of an electrocoated steel plate was spray-coated an aminoalkyd type intermediate coat (Amilac TP-37 Gray manufactured by KANSAI PAINT CO., LTD.) so as to give a film thickness of about 35 μm when dried. Baking was conducted at 140° C. for 20 minutes. Thereon was spray-coated an aminoalokyd type top coat (Amilac TM 13 White manufactured by KANSAI PAINT CO., LTD.) so as to give a film thickness of about 35 μm when dried. Baking was conducted at 140° C. for 20 minutes. The resulting plate was measured for clarity using an image clarity meter manufactured by Suga Tester K. K.

⊙: Measured value =80 or more
○: Measured value =75 or less than 80
Δ: Measured value =70 to less than 75
X: Measured value =less than 70

What we claim is:

1. A blocked isocyanate group-containing electrocoating composition which consists essentially of:
   (A) a blocked isocyanate group-containing vehicle resin selected from the group consisting of self-crosslinking amine-epoxy resin adduct vehicle resins having a blocked isocyanate group and an active hydrogen in their molecules, and external crosslinking vehicle resin compositions consisting essentially of (1) an amine-epoxy resin adduct and (2) a blocked isocyanate compound,
   (B) at least one dialkyltin aromatic carboxylate represented by the following formula (I) or (II)

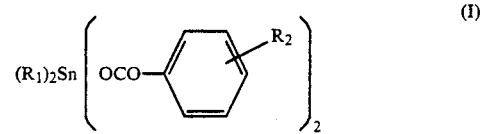

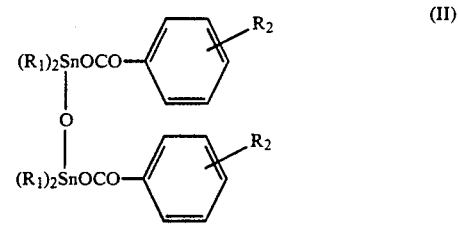

wherein $R_1$ represents an alkyl group having 1-12 carbon atoms and $R_2$ represents a hydrogen atom or an alkyl group having 1-4 carbon atoms, and
   (c) at least one bismuth or zirconium compound.

2. The electrocoating composition of claim 1, wherein the dialkyltin aromatic carboxylate (B) is selected from the group consisting of bid(dioctylbenzoyloxytin) oxide, bis(dibutylbenzoyloxytin) oxide, dioctyltin dibenzoate and dibutyltin dibenzoate.

3. The electrocoating composition of claim 1, wherein the bismuth of zirconium compound (C) is selected from the group consisting of bismuth hydroxide, bismuth trioxide, bismuth nitrate, bismuth benzoate, bismuth citrate, bismuth oxycarbonate, bismuth silicate, zirconium dioxide, zirconium silicate and zirconium hydroxide.

4. The electrocoating composition of claim 3, wherein the bismuth or zirconium compound (C) is selected from the group consisting of bismuth hydroxide, bismuth silicate and zirconium hydroxide.

5. The electrocoating composition of claim 1, wherein the component (c) is bismuth hydroxide.

6. The electrocoating composition of claim 1, where the dialkyltin aromatic carboxylate (B) and the bismuth or zirconium compound (C) are present in a total amount of 0.1–10 parts by weight per 100 parts of the resin solid content in the electrocoating composition.

7. The electrocoating composition of claim 6, where the dialkyltin aromatic carboxylate (B) and the bismuth or zirconium compound (C) are present in a total amount of 0.2–5 parts by weight per 100 parts of the resin solid content in the electrocoating composition.

8. The electrocoating composition of claim 1, wherein the weight ratio (B):(C) of the dialkyltin aromatic carboxylate (B) and the bismuth or zirconium compound (C) is in the range of 1:10 to 10:1.

9. The electrocoating composition of claim 8, wherein the weight ratio (B):(C) of the dialkyltin aromatic carboxylate (B) and the bismuth or zirconium compound (C) is in the range of 1:5 to 5:1.

10. An electrocoating bath containing the electrocoating composition of claim 1.

11. An electrocoating method which comprises coating the electrocoating composition of claim 1 on the surface of a substrate by electrodeposition.

12. A coated article obtained by the electrocoating method of claim 11.

* * * * *